Patented June 15, 1943

2,321,728

UNITED STATES PATENT OFFICE 2,321,728

INTERPOLYMERIZED SUBSTANCE CONTAINING UNSATURATED METHYLENE GROUPS

Carl E. Barnes, Worcester, Mass., assignor, by mesne assingments, to E. I. du Pont de Nemours & Company, Wilmington, Del., a corporation of Delaware No Drawing. Application December 11, 1939, Serial No. 308,646

4 Claims. (Cl. 260—84)

This case relates to interpolymerized substances containing unsaturated methylene groups.

It has been found that various monomeric unsaturated methylene compounds, such as methyl methacrylate, polymerize to form highly transparent and tough resins. But such compounds may have too low a softening point or they may be too easily scratched for various special uses. These substances may, however, have their hardness increased and their softening point raised by interpolymerization with acrylic anhydride and methacrylic anhydride. These anhydrides contain two independently polymerizable unsaturated methylene groups per molecule; and during polymerization with another substance containing but one of these groups, the growing chains incorporate molecules of both substances and form an interpolymer having a three dimensional structure wherein the linkages are established between the chains to an extent depending upon the amount of cross linking agent used. These anhydrides are very active cross linking agents and make very hard and satisfactory bodies for many uses. It, however, is desirable to produce resins which are both hard and stronger than those produced by such a cross linking agent, or to modify other characteristics of the copolymer, such as the softening point or solubility without losing the desirable properties imparted by the anhydride.

It is the primary object of this invention to overcome that problem and to provide a copolymer of various base substances with modifying agents which will provide desired properties relative to strength, softening point, solubility and hardness or other characteristics and thus making a body which is suitable for use in various fields.

A further object is to modify the properties of a chosen base substance and provide a transparent resin which is both hard and strong and which can be readily shaped by a grinding and polishing operation so as to give an optical image. Further objects will be apparent in the following disclosure.

In accordance with this invention, I propose to copolymerize various base substances containing a single unsaturated methylene group with acrylic or methacrylic anhydride in a limited amount of not over 7 to 10% by weight to impart desired hardness characteristics thereto and with a compatible and miscible amount of a further modifying agent which improves the strength or adds further desirable properties. The base substances comprise:

The methyl and ethyl alcohol esters of acrylic and methacrylic acids, i. e., methyl acrylate, ethyl acrylate, methyl methacrylate and ethyl methacrylate;

The vinyl esters of the lower aliphatic acids, i. e., vinyl formate, vinyl acetate, vinyl propionate and the vinyl butyrate; and Methyl vinyl ketone, methyl isopropenyl ketone and styrene.

As a modifying agent for changing and improving the properties of the resin formed by the other two substances, I employ vinyl acrylate or vinyl methacrylate which are the vinyl esters of acrylic and methacrylic acid.

The acrylic and methacrylic anhydrides, which may be made by suitable procedure, are desirable cross linking and hardening agents for interpolymerization with the various base substances above listed, and particularly with methyl methacrylate. But, if only 7 to 10% of the cross linking agent, such as methacrylic anhydride, is used, the cross linkages between the chains may be too infrequent to give a required strength or a high enough softening point or a sufficiently low solubility for many uses and particularly in the optical field.

I have found that vinyl acrylate or methacrylate will further increase the strength or improve other properties of the copolymer formed by the base substance and the anhydride without rendering the material too highly strained or making it too brittle for many desired purposes. These vinyl compounds are specifically described and claimed in the copending application of Carl E. Barnes, Serial No. 227,108 filed August 27, 1938, and they may be made as there set forth.

For example, vinyl methacrylate may be prepared by the addition of acetylene to methacrylic acid using a mercuric sulfate catalyst. According to that method, five grams of mercuric oxide are dissolved in one hundred cubic centimeters of glacial acetic acid heated to a temperature of 85 to 90° C. with vigorous stirring. To this mixture is added 3.3 cc. (one per cent excess) of concentrated sulfuric acid mixed with 5 cc. of glacial acetic acid and this mixture is added slowly with stirring to the mercuric acetate solution. The mercuric sulfate is then allowed to settle and the greater part of the acetic acid drawn off by suction. Most of the sulfuric acid is washed out of the catalyst by the addition of 100 cc. of glacial acetic acid and drawing off all but about 25 cc. To this catalyst 100 cc. of the hundred per cent methacrylic acid containing pyrogallol as a polymerization inhibitor is added and the mixture heated to 85 to 90° C. Acetylene gas after passing through sulfuric acid is added to the mixture at the rate of about eight liters per hour. The gases issuing from the reaction flask are passed through a trap cooled in ice water which collects a considerable quantity of vinyl methacrylate. At the end of six or eight hours the catalyst is filtered off and the filtrate is combined with the liquid from the trap, the mixture diluted with ether and the ether solution washed with aqueous sodium carbonate until neutral. After drying the ether solution with calcium chloride it is distilled. Ether and vinyl acetate distill off and are not condensed. The first product collected is vinyl methacrylate which boils at 48 degrees at 60 mm. The next product collected is ethylidene dimethacrylate which boils at eighty-nine to ninety-one degrees at eleven millimeters. Ethylidene dimethacrylate is the subject matter of a copending application of Loring Coes, Jr., Serial No. 239,533 filed November 8, 1938 and issued June 2, 1942 as U. S. Patent 2,284,639.

Conditions may be changed to give a greater yield of vinyl methacrylate by increasing the rate of flow of acetylene and condensing the vinyl methacrylate in the trap outside the reaction mixture thereby preventing secondary reaction to give ethylidene dimethacrylate.

Vinyl methacrylate rapidly polymerizes at room temperature to form a hard transparent colorless resin having an index of refraction of 1.503. This polymer is insoluble and infusible. By substituting acrylic acid for methacrylic acid, following the same procedure I may make vinyl acrylate.

The interpolymers of the base substance with the anhydride and the vinyl ester of acrylic or methacrylic acid may be made by mixing the monomers thereof in any proportions in which the materials are fully miscible or are soluble in one another, so that the interpolymers are formed as homogenous one phase substances. The proportions used determine the properties of the product. Ordinarily, I use not over 50% of the vinyl compound and preferably about 10 to 20%, although lesser amounts are often desirable.

As specific examples illustrating various phases of this invention, I may make a triple polymer for use as an optical body comprising methyl methacrylate copolymerized with 7% of methacrylic anhydride and 10% of vinyl methacrylate, which are miscible in their monomeric liquid forms and may be polymerized by standard procedure, such as heating the mixture in a mold at 60° C. The product is a transparent hard body that is not strained or cracked detrimentally. As a further example, I may copolymerize methyl methacrylate with 7% of methacrylic anhydride and larger amounts of the vinyl ester or vice versa, as required to form different types of resins for use as abrasive bonds and molded articles of various utilities.

It will now be appreciated that one may substitute the other above listed monohydric alcohol esters of the acrylic and methacrylic acids for the methyl methacrylate given in the examples. Likewise, the vinyl esters of the lower aliphatic acids, such as vinyl acetate, are particularly useful as base substances and they may be brought to that degree of hardness and strength which renders them fit for use as optical bodies, abrasive bonds and molded bodies, etc., by being hardened with acrylic or methacrylic anhydride up to the limit of about 10% of the anhydride and by having their properties further modified by the use of up to about 50% of the vinyl esters of acrylic and methacrylic acids. Also, styrene, methyl vinyl ketone and methyl isopropenyl ketone may be used. The proportions above specified will serve for each of the base substances, but they may be varied widely.

The interpolymers may be used for bonding various types of granular materials, such as abrasive grains, and in such cases the proportion of the modifying agents employed will be governed by the requirements of the final product. If abrasive grains, such as crystalline alumina, silicon carbide, boron carbide or diamonds, are to be bonded by the interpolymer, the mixture of chosen monomeric substances may be incorported with the grain in desired proportions and the bond polymerized by heat, with or without the aid of catalysts, such as benzoyl peroxide. Suitable procedure may be adapted for making such bonded articles in accordance with the methods set forth in the applications of Kistler and Barnes, Serial No. 187,549, filed January 28, 1938, and issued October 22, 1940, as U. S. Patent 2,218,795, and Serial No. 228,004, filed September 1, 1938 and issued September 23, 1941, as U. S. Patent 2,256,618. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, the monomeric polymerizable mixture may be used only in sufficient amount to wet the grains and be solidified by polymerization in the presence thereof. Other suitable procedures as set forth in prior applications may be employed with the base substance and the modifying agents herein disclosed and this invention is deemed to cover the products thus made.

It is to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

This case is a continuation in part of my copending application Serial No. 253,625 filed Jan. 30, 1939.

I claim:

1. An interpolymer of a base substance selected from the group consisting of the methyl and ethyl esters of acrylic and methacrylic acids, copolymerized with not over 10% of a substance from the group consisting of acrylic and methacrylic anhydrides, and with not over 50% of a substance from the group consisting of the vinyl esters of acrylic and methacrylic acids.

2. An interpolymer of a base substance selected from the group consisting of the methyl and ethyl esters of acrylic and methacrylic acids, copolymerized with 7-10% of a substance from the group consisting of acrylic and methacrylic anhydrides, and with 10-20% of a substance from the group consisting of the vinyl esters of acrylic and methacrylic acids.

3. An interpolymer of methyl methacrylate copolymerized with not over 10% of methacrylic anhydride, and with not over 50% of vinyl methacrylate.

4. An interpolymer of methyl methacrylate copolymerized with 7-10% of methacrylic anhydride, and with 10-20% of vinyl methacrylate.

CARL E. BARNES.